(12) United States Patent
Salem et al.

(10) Patent No.: US 11,002,455 B2
(45) Date of Patent: May 11, 2021

(54) AIR CONDITIONING SYSTEM AND METHOD

(71) Applicants: Mohamed Farouk Salem, Fresno, CA (US); Michael Robert Sullivan, Scottsdale, AZ (US)

(72) Inventors: Mohamed Farouk Salem, Fresno, CA (US); Michael Robert Sullivan, Scottsdale, AZ (US)

(73) Assignee: Air₂O Inc., Phoenix, AZ (US)

( * ) Notice: Subject to any disclaimer, the term of this patent is extended or adjusted under 35 U.S.C. 154(b) by 93 days.

(21) Appl. No.: 16/190,629

(22) Filed: Nov. 14, 2018

(65) Prior Publication Data
US 2020/0149767 A1   May 14, 2020

(51) Int. Cl.
| | | |
|---|---|---|
| *F24F 11/46* | (2018.01) | |
| *F24F 11/00* | (2018.01) | |
| *F24F 11/56* | (2018.01) | |
| *F24F 11/64* | (2018.01) | |
| *F24F 11/65* | (2018.01) | |
| *F24F 11/80* | (2018.01) | |
| *G05B 19/042* | (2006.01) | |
| *F24F 110/10* | (2018.01) | |
| *F24F 110/20* | (2018.01) | |
| *F24F 140/50* | (2018.01) | |
| *F24F 140/60* | (2018.01) | |
| *F24F 110/12* | (2018.01) | |

(52) U.S. Cl.
CPC .......... *F24F 11/46* (2018.01); *F24F 11/0008* (2013.01); *F24F 11/56* (2018.01); *F24F 11/64* (2018.01); *F24F 11/65* (2018.01); *F24F 11/80* (2018.01); *G05B 19/042* (2013.01); *F24F 2110/10* (2018.01); *F24F 2110/12* (2018.01); *F24F 2110/20* (2018.01); *F24F 2140/50* (2018.01); *F24F 2140/60* (2018.01); *F24F 2203/12* (2013.01); *G05B 2219/2614* (2013.01)

(58) Field of Classification Search
None
See application file for complete search history.

(56) References Cited

U.S. PATENT DOCUMENTS

| | | |
|---|---|---|
| 1,970,057 A | 8/1934 | Otto |
| 2,075,487 A | 3/1937 | Van Zandt |
| 5,346,129 A | 9/1994 | Shah et al. |
| 5,548,643 A | 8/1996 | Dalgleish |
| 5,626,288 A | 5/1997 | Huber |

(Continued)

*Primary Examiner* — Paul B Yanchus, III
(74) *Attorney, Agent, or Firm* — Squire Patton Boggs (US) LLP

(57) ABSTRACT

A system cools a space toward target conditions using an air conditioning process based on a bank of different cooling device types. Some device types consume relatively less energy and are suitable for mild environmental conditions, others consume more energy and are needed for extreme conditions, while others may fill a middle ground. To help save energy, the system alters the air conditioning process by selecting one or a mix of cooling device types expected to be sufficient for current conditions. Current conditions corresponds to a supply air position on a psychrometric chart. Selection of the appropriate cooling device type(s) is made according to the location of the supply air position relative to a dew point, which is determined from the target conditions set by a user.

20 Claims, 12 Drawing Sheets

(56) References Cited

U.S. PATENT DOCUMENTS

| | | | |
|---|---|---|---|
| 5,732,879 A | 3/1998 | Low | |
| 5,737,934 A | 4/1998 | Shah | |
| 5,904,047 A | 5/1999 | An | |
| 6,070,110 A | 5/2000 | Shah et al. | |
| 6,681,584 B1 * | 1/2004 | Conner | F24F 5/0035 62/171 |
| 6,892,547 B2 | 5/2005 | Strand | |
| 7,178,350 B2 | 2/2007 | Shah | |
| 7,246,487 B2 | 7/2007 | Hara | |
| 7,770,806 B2 | 8/2010 | Herzon et al. | |
| 7,793,510 B2 | 9/2010 | Perry et al. | |
| 7,854,389 B2 | 12/2010 | Ahmed | |
| 8,155,900 B1 | 4/2012 | Adams | |
| 8,392,025 B2 | 3/2013 | Orfield | |
| 8,660,708 B2 | 2/2014 | Narayanamurthy et al. | |
| 8,695,887 B2 | 4/2014 | Helt et al. | |
| 2006/0032253 A1 | 2/2006 | Lee et al. | |
| 2006/0042283 A1 | 3/2006 | Hwang et al. | |
| 2006/0059928 A1 | 3/2006 | Fujiyoshi et al. | |
| 2006/0168972 A1 | 8/2006 | Fry | |
| 2007/0100666 A1 | 5/2007 | Stivoric et al. | |
| 2008/0203178 A1 | 8/2008 | Barrett et al. | |
| 2008/0217418 A1 | 9/2008 | Helt et al. | |
| 2008/0314998 A1 | 12/2008 | Herzon et al. | |
| 2009/0159716 A1 | 6/2009 | Kim | |
| 2010/0063644 A1 | 3/2010 | Kansai et al. | |
| 2010/0070084 A1 | 3/2010 | Steinberg et al. | |
| 2010/0211224 A1 * | 8/2010 | Keeling | F24F 13/0209 700/277 |
| 2011/0040412 A1 * | 2/2011 | Wiese | F24F 13/18 700/275 |
| 2011/0049252 A1 | 3/2011 | Lu et al. | |
| 2012/0029725 A1 | 2/2012 | Lafleur et al. | |
| 2012/0212166 A1 | 8/2012 | Merkel et al. | |
| 2012/0291468 A1 | 11/2012 | Kato et al. | |
| 2013/0055744 A1 | 3/2013 | Travers | |
| 2013/0075484 A1 | 3/2013 | Rhee et al. | |
| 2013/0276462 A1 | 10/2013 | Bollmann | |
| 2013/0299157 A1 | 11/2013 | Murayama et al. | |
| 2014/0000836 A1 | 1/2014 | Xu et al. | |
| 2014/0058566 A1 | 2/2014 | Rains et al. | |
| 2014/0084072 A1 | 3/2014 | Conner et al. | |
| 2014/0096946 A1 | 4/2014 | Rognli et al. | |
| 2014/0206278 A1 * | 7/2014 | Stevenson | F24F 11/76 454/343 |
| 2014/0262196 A1 | 9/2014 | Frank et al. | |
| 2015/0032269 A1 | 1/2015 | Nishimiya et al. | |
| 2016/0098026 A1 | 4/2016 | Salem et al. | |

* cited by examiner

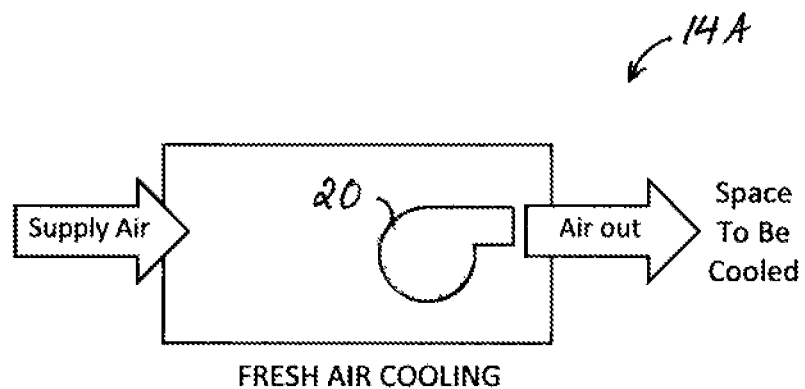
FIG. 2 FRESH AIR COOLING
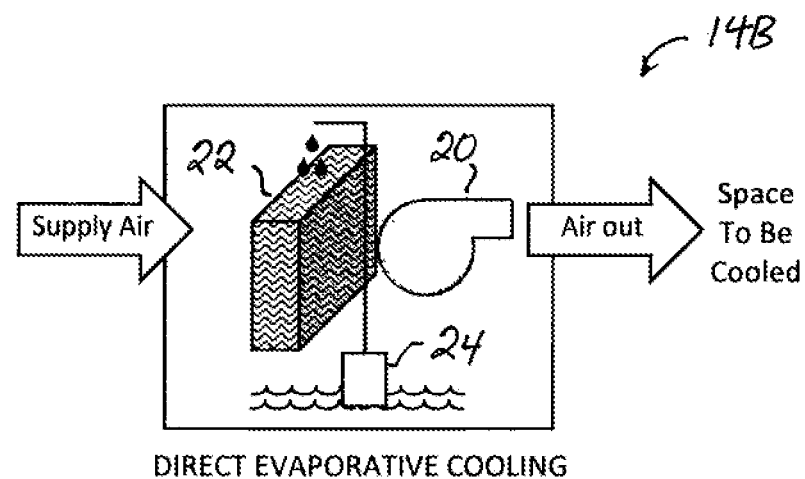
FIG. 3 DIRECT EVAPORATIVE COOLING
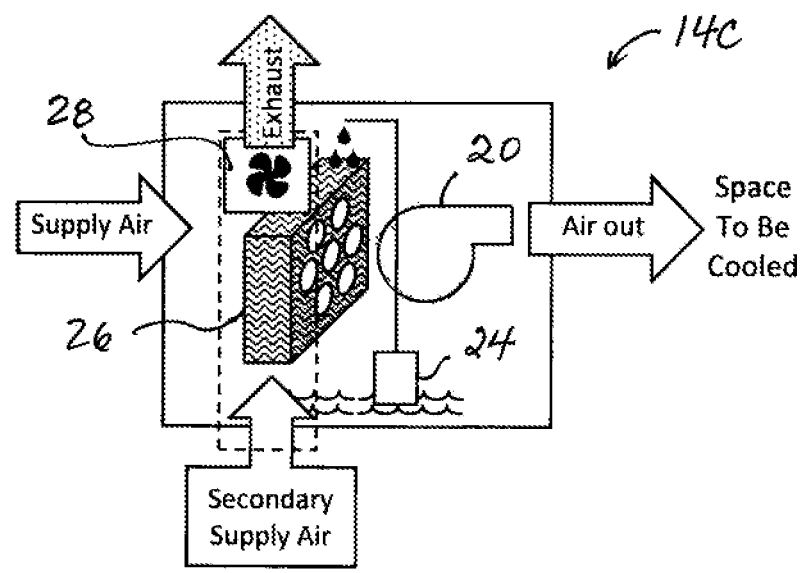
FIG. 4 INDIRECT EVAPORATIVE COOLING

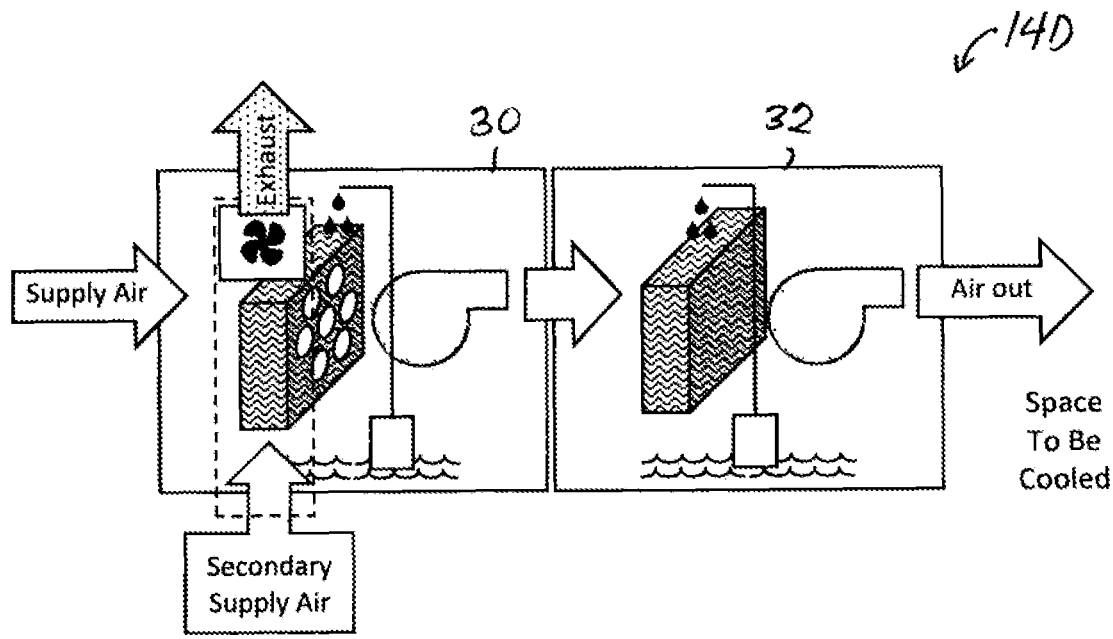
FIG. 5  INDIRECT/DIRECT EVAPORATIVE COOLING
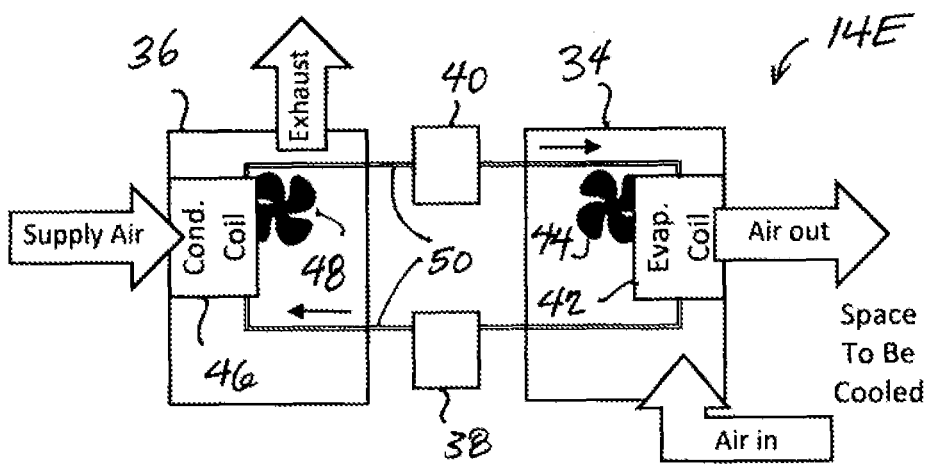
FIG. 6  DIRECT EXPANSION COOLING

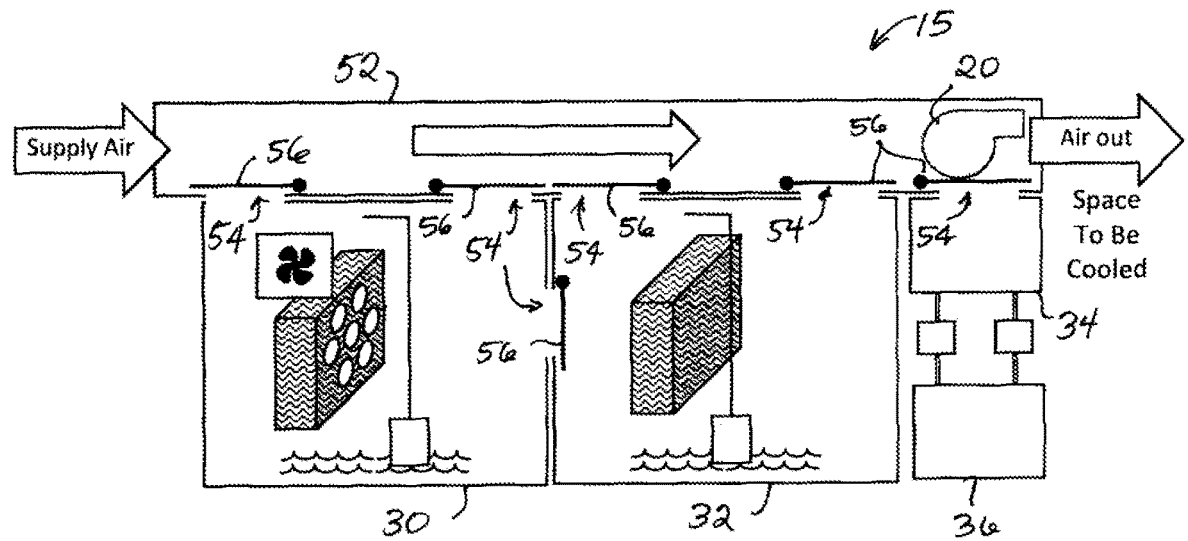
FIG. 7A     FRESH AIR COOLING
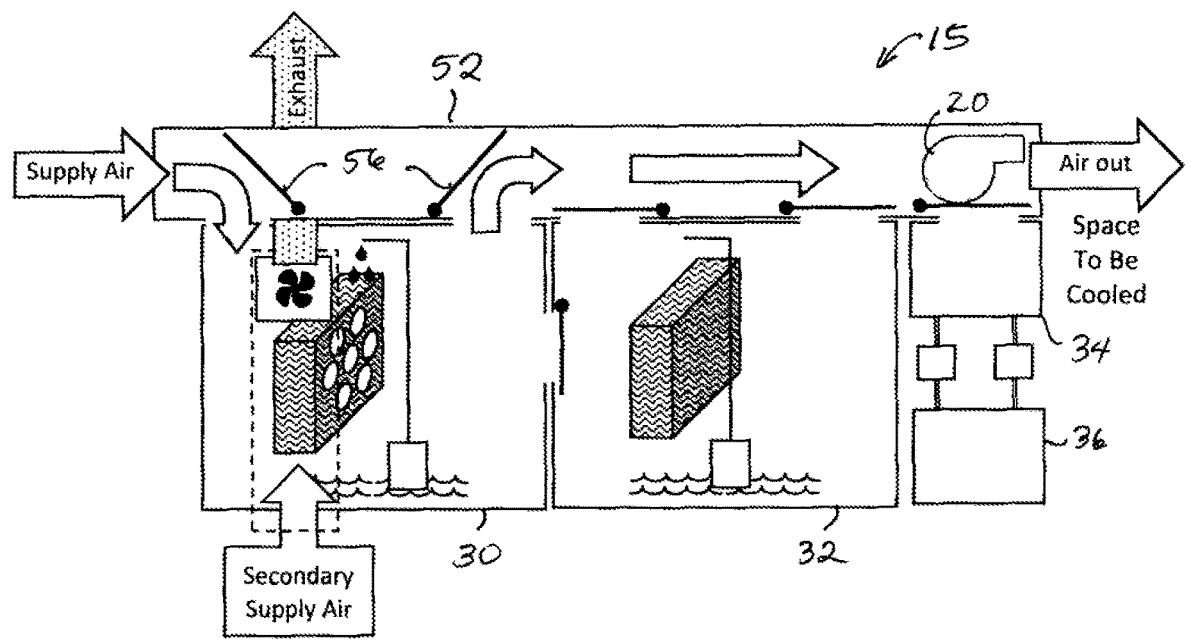
FIG. 7B     INDIRECT EVAPORATIVE COOLING

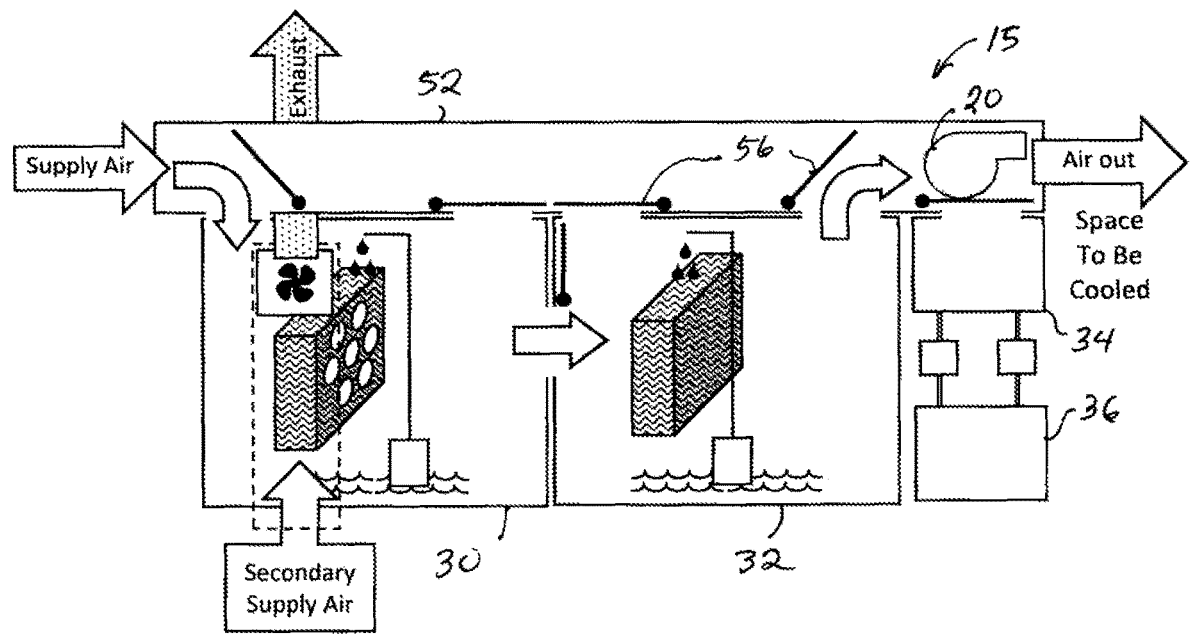
FIG. 7C  INDIRECT/DIRECT EVAPORATIVE COOLING
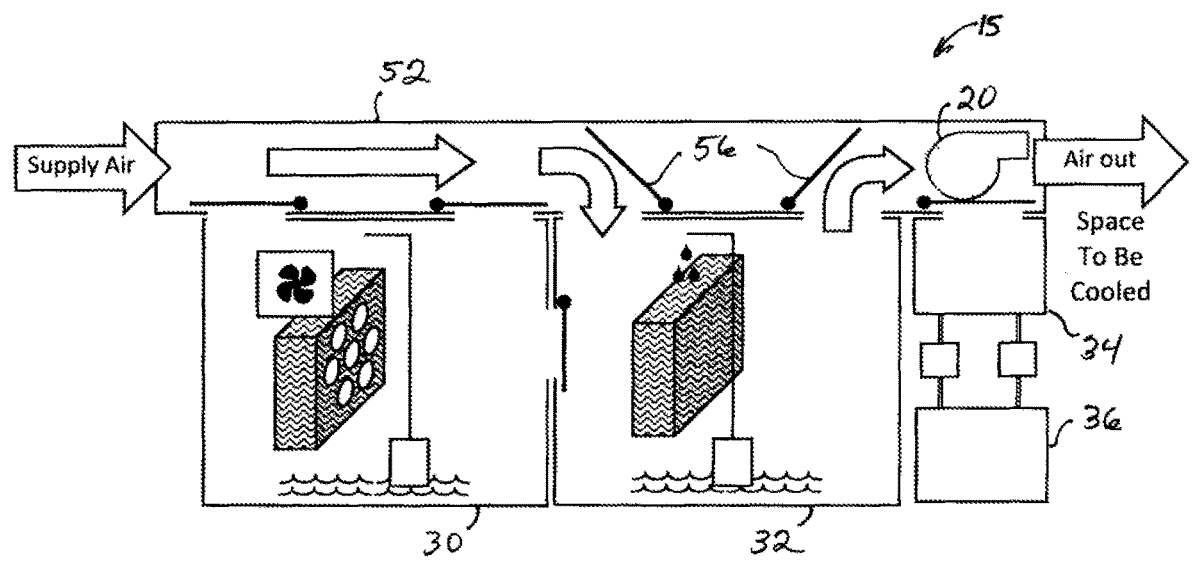
FIG. 7D  DIRECT EVAPORATIVE COOLING

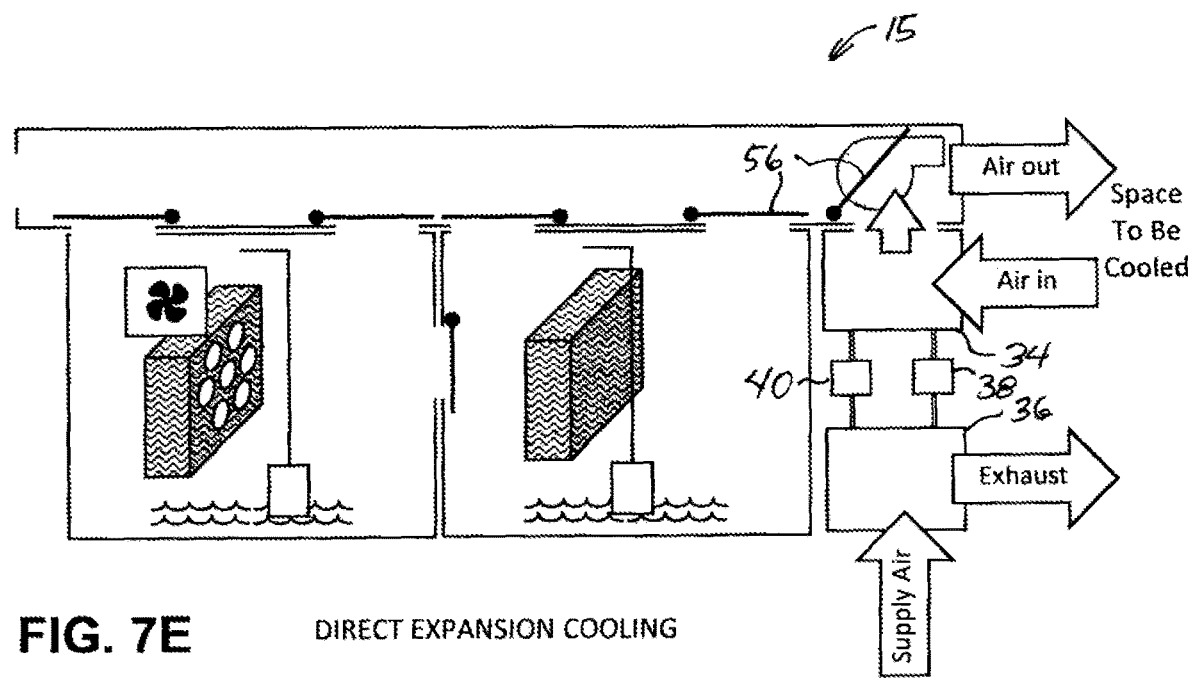
FIG. 7E  DIRECT EXPANSION COOLING

AIR CONDITIONING SYSTEM AND METHOD

FIELD

This disclosure relates generally to air conditioning and, more particularly, controls for air conditioning.

BACKGROUND

People live in a spectrum of environmental conditions that vary between hot, mild, cold, dry, and wet. However, engineers typically design a cooling system based on a single extreme condition, whether in the summer or winter. This extreme condition is often referred to as the AHRAE Design Condition. ASHRAE is an acronym for American Society of Heating, Refrigerating and Air-Conditioning Engineers. This design approach based on a single extreme condition helps to ensure that the cooling system has the capacity to handle all possible conditions. The cooling system is often used when conditions are not extreme, which can mean that more energy than necessary is used for cooling. The situation is akin to using a vehicle with a large engine for transporting light loads in a metropolitan city most of time, although sometimes it is used to transport extremely heavy loads on rugged terrain. With ever increasing demands for energy efficient cooling systems, there is a continuing need for an air conditioning system and method capable of altering the primary cooling engine according to current conditions.

SUMMARY

Briefly and in general terms, the present invention is directed to an air conditioning system and method.

In aspects of the invention, a system comprises a supply air temperature sensor, a supply air humidity sensor, and a plurality of available devices of different types comprising at least two of a fresh air cooling device, a direct evaporative cooling device, an indirect evaporative cooling device, an indirect/direct evaporative cooling device, and a direct expansion cooling device. The system comprises a controller configured to store a target point defining a target humidity ratio (Ht) and a target dry bulb temperature (Tt), determine a dew point from the stored target point, use output from the supply air temperature sensor and the supply air humidity sensor to determine a supply air position in a psychrometric chart, alter an air conditioning process by selecting one or more of the available devices to cool a space, and operate the one or more selected available devices to cool the space according to the altered air conditioning process. Selection is performed according to location of the supply air position in the psychrometric chart relative to the dew point.

In aspects of the invention, a method comprises storing a target point, determining a dew point from the stored target point, altering an air conditioning process for cooling a space, cooling the space according to the altered air conditioning process. Alteration of the air condition process comprises selecting one or more of a plurality of available devices of different types for use in the air conditioning process, the different types being concurrently available in an air conditioning system and comprising at least two of a fresh air cooling device, a direct evaporative cooling device, an indirect evaporative cooling device, an indirect/direct evaporative cooling device, and a direct expansion cooling device. The selection of devices is performed according to location of a supply air position in a psychrometric chart relative to the dew point.

The features and advantages of the invention will be more readily understood from the following detailed description which should be read in conjunction with the accompanying drawings.

BRIEF DESCRIPTION OF THE DRAWINGS

FIG. 2 is a schematic diagram showing an example fresh air cooling device.

FIG. 3 is a schematic diagram showing an example direct evaporative cooling device.

FIG. 4 is a schematic diagram showing an example indirect evaporative cooling device.

FIG. 5 is a schematic diagram showing an example indirect/direct evaporative cooling device.

FIG. 6 is a schematic diagram showing an example direct expansion cooling device.

FIGS. 7A-7E are schematic diagrams showing an example combination device.

DETAILED DESCRIPTION

Figure 1:
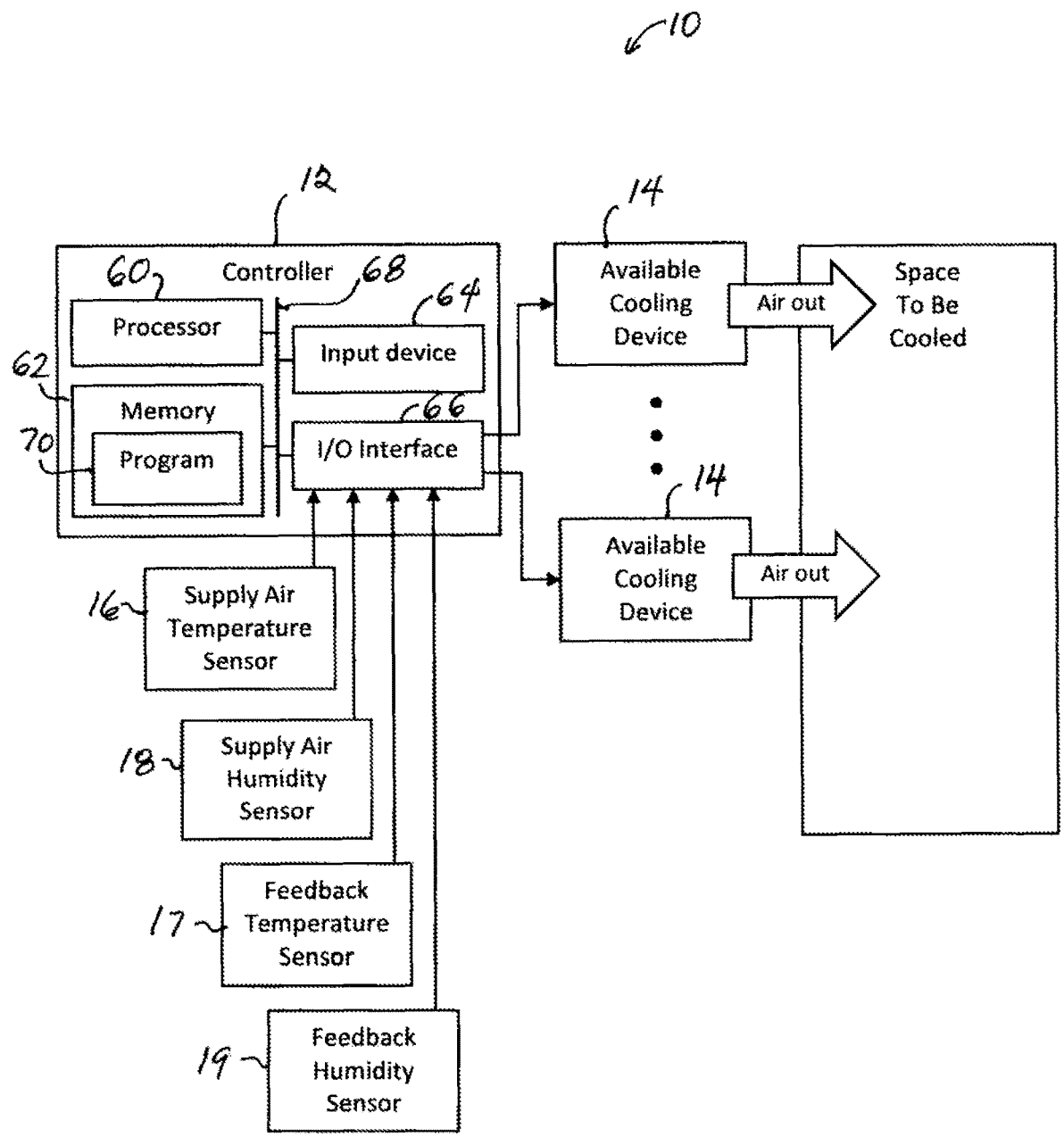
FIG. 1 is a schematic block diagram showing an example air conditioning system comprising at least two different types of cooling devices for cooling a space.

Referring now in more detail to the drawings for purposes of illustrating non-limiting examples, wherein like reference numerals designate corresponding or like elements among the several views, there is shown in FIG. 1 example air conditioning system 10 for cooling a space to within a comfort zone. System 10 comprises controller 12 that is configured to control operation of concurrently available cooling devices 14 depending on supply air conditions. In a case where the interior of a room or building is the space to be cooled, the supply air can be air obtained from outside the room or building. System 10 further comprises supply air temperature sensor 16 and supply air humidity sensor 18, from which controller 12 ascertains supply air conditions. System 10 also comprises feedback temperature sensor 17 and feedback humidity sensor 19, from which controller 12 ascertains air conditions in the space to be cooled. As will be described further below, a target point (desired humidity and temperature) lies within the comfort zone, and controller 12 determines a dew point for the target point. Controller 12 evaluates supply air conditions relative to the dew point to alter an air conditioning process. The altered air conditioning process is intended to save energy by taking into account capabilities and limitations of various cooling devices 14.

System 10 has a plurality of concurrently available cooling devices 14 of at least two different types. The different cooling device types may be any of a fresh air cooling device, a direct evaporative cooling device, an indirect evaporative cooling device, an indirect/direct evaporative cooling device, and a direct expansion cooling device. The device types are analogous to cooling engines or drivers. As explained below, some are effective when supply air conditions are mild, while others are more suitable when supply air conditions are less mild or extreme. Controller 12 selects one or more of the different cooling device types to alter an air conditioning process for improved efficiency and lower energy consumption. Rectangles for two available cooling devices 14 of different types are illustrated. The ellipsis (three dots) indicate that system 10 may have more than two different types of available cooling devices.

FIGS. 2-6 illustrate five different types of cooling devices 14. System 10 may comprise any two, three, or four of them. Alternatively, system 10 may comprise all five of them.

FIG. 2 illustrates example fresh air cooling device 14A. Device 14A comprises blower 20 configured to force supply air into the space to be cooled. Blower 20 comprises a motor and impellers or blades that are rotated by the motor to force supply air into the space to be cooled. Device 14A does not actively cool the supply air. Device 14A uses neither water evaporation nor refrigerant to cool the air. Air out will have a temperature and humidity that is the same or nearly the same as the supply air. As used herein, "nearly the same" means within 5% of degrees Celcius. Temperature and humidity of air out may differ slightly from that of the supply air due environmental loads inherent in ductwork and associated machinery. Device 14A has the potential advantage of lower energy consumption compared to other types of cooling devices.

In FIG. 3, example direct evaporative cooling device 14B comprises blower 20 configured to force supply air into the space to be cooled. Device 14B actively cools the supply air by exposing it to evaporating water. Device 14B does not use refrigerant to cool the air. Device 14B comprises porous media 22 and pump 24. Pump 24 is used to wet porous media 22 with water. Blower 20 causes the supply air to pass through porous media 22. The supply air makes contact with the water. Water evaporates directly into the air stream, which reduces the air temperature while humidifying the air. Thus, device 14B may be suitable when the supply air is low in humidity. Device 14B has the potential advantage of lower energy consumption compared to other types of cooling devices that require compressors and/or a greater number of blowers, fans, pumps, etc.

In FIG. 4, example indirect evaporative cooling device 14C comprises blower 20 configured to force supply air into the space to be cooled. Device 14C actively cools the supply air that is delivered to a space without exposing the air to evaporating water. Device 14C does not use refrigerant to cool the air. Device 14C comprises heat exchanger 26, pump 24, and exhaust fan 28. Heat exchanger 26 contains porous media, which pump 24 wets with water. Exhaust fan 28 draws secondary supply air through the wet porous media. Water evaporates directly into stream of the secondary supply air, which reduces the temperature of heat exchanger 26. The secondary supply air is not delivered to the space and is expelled as exhaust. Channels pass through heat exchanger 26. The interior walls of the channels do not become wet with water from pump 24. Blower 20 draws the supply air through the channels, thereby cooling the supply air. The channels isolate the supply air from the water from pump 24, so the supply air is cooled without being humidified. Thus, device 14C may be suitable when the supply air is high in humidity but still below the desired humidity. Device 14C has the potential advantage of lower energy consumption compared to other types of cooling devices that require compressors and/or a greater number of blowers, fans, pumps, etc.

As shown in FIG. 5, direct evaporative cooling device 14B and indirect evaporative cooling device 14C may be combined to form example indirect/direct evaporative cooling device 14D. Device 14D does not use refrigerant to cool the air. Device 14D comprises first chamber 30 and second chamber 32. First chamber 30 is the same as indirect evaporative cooling device 14C, except the output air is conveyed into second chamber 32 instead of the space to be cooled. The output air from first chamber 30 is cooled further in second chamber 32. Second chamber 32 is the same as direct evaporative cooling device 14B. With two cooling chambers, device 14B may be suitable when the supply air temperature is high but not overly humid. Device 14D has the potential advantage of lower energy consumption compared to other types of cooling devices that require a compressor for refrigerant.

In FIG. 6, example direct expansion cooling device 14E comprises evaporator assembly 34, condenser assembly 36, compressor 38, and thermal expansion control device 40. Evaporator assembly 34 may be located inside or adjacent to the space to be cooled while evaporator assembly 36 is located outside the space to be cooled. Evaporator assembly 34 comprises evaporator coil 42 and evaporator fan 44. Condenser assembly comprises condenser coil 46 and condenser fan 48.

Evaporator coil 42, compressor 38, condenser coil 46, and thermal expansion control device 40 are interconnected by conduit 50 that conveys refrigerant. Evaporator fan 44 draws air into evaporator assembly 34 and through evaporator coil 42, which functions as a heat exchanger. The refrigerant expands in evaporator coil 42 as it absorbs heat from the air that is drawn into evaporator assembly 34. Evaporator fan 44 expels the cooled air out to the space to be cooled. The air drawn into evaporator assembly 34 may come from the space to be cooled, in which case, moisture in the air may be reduced due to condensation on exterior surfaces of evaporator coil 42. Thus, device 14E may be suitable for reducing humidity in the space to be cooled. Meanwhile, condenser fan 48 draws supply air into condenser assembly 36 and through condenser coil 46, which functions as another heat exchanger. Evaporator assembly 34 pumps the refrigerant to compressor 38. Compressor 38 compresses the refrigerant, causing it to condense within condenser coil 46 while releasing heat to the supply air. Condenser fan 48 expels the supply air as warm exhaust air. The condensed liquid refrigerant flows to thermal expansion control device 40, which controls the flow and pressure of the refrigerant returning to evaporator coil 42. The refrigerant is able to cool air to a lower temperature than evaporating water. Thus, device 14E may be suitable when the supply air temperature and/or humidity are significantly greater than the desired conditions for the space to be cooled.

As shown in FIGS. 7A-7C, cooling devices 14A-14E may be combined to form example combination device 15. Combination device 15 comprises first chamber 30 and second chamber 32, which are the same as indirect evaporative cooling device 14C (FIG. 4) and direct evaporative cooling device 14B (FIG. 3) except blowers for each chamber may be omitted. Combination device 15 comprises third chamber 52, which is the same as fresh air cooling device 14A (FIG. 2). First chamber 30, second chamber 32, and third chamber 52 are interconnected by channels 54 that allow air to flow to and from the chambers due to the action of blower 20 in third chamber 52. Combination device 15 comprises dampers 56. There is one damper 56 at each channel 54. Each damper 56 can be opened and closed by action of an electric motor operated by controller 12. Dampers 56 selectively block and allow airflow through channels 54 to enable combination device 15 to function as any one of the five types of cooling devices described above.

In FIG. 7A, controller 12 has set a first combination of open and closed dampers 56 to select fresh air cooling device 14A (FIG. 2). Supply air travels through third chamber 52 while bypassing first chamber 30 and second chamber 32. In FIG. 7B, controller 12 has set a second combination of open and closed dampers 56 to select indirect evaporative cooling device 14C (FIG. 4). Supply air is diverted into first chamber 30 and then continues through third chamber 52 while bypassing second chamber 32. In FIG. 7C, controller 12 has set a third combination of open and closed dampers 56 to select indirect/direct evaporative cooling device 14D (FIG. 5). Supply air is diverted into first chamber 30, passes into second chamber 32, and continues to third chamber 52. In FIG. 7D, controller 12 has set a fourth combination of open and closed dampers 56 to select direct evaporative cooling device 14B (FIG. 3). Supply air is diverted into second chamber 32 while bypassing first chamber 30, and then continues to third chamber 52. In FIG. 7E, controller 12 has set a fifth combination of open and closed dampers 56 to select direct expansion cooling device 14E (FIG. 6). Supply air is drawn into condenser assembly 36 and expelled as warm exhaust air outside of the space to be cooled. The air in the space is drawn into evaporator assembly 34 and expelled as cold, dehumidified air into the space.

In the illustrated examples, combination device 15 enables controller 12 to select any of five different types of cooling devices. Alternatively, the combination device may be configured to enable controller 12 to select from a fewer number device types.

Referring again to FIG. 1, example controller 12 comprises one or more processors 60, one or more memory devices 62, one or more input devices 64, and input/output interface 66, all of which are interconnected via bus 68. The one or more processors 60 is/are referred to as processor 60. Processor 60 comprises circuits and electronic components that execute instructions of air conditioning program 70. Air conditioning program 70 enables controller 12 to perform various processes and functions described herein.

The one or more memory devices 62 is/are referred to as memory 62. Memory 62 comprises any one or a combination of random-access memory (RAM) modules, read-only memory (ROM) modules, and other electronic data storage devices. Memory 62 may include a mass storage type of device such as a solid-state flash drive, CD drive, or DVD drive. Memory 62 comprises a non-transitory computer readable medium that stores air conditioning program 70 and data for various processes described herein.

The one or more input devices 64 is/are referred to as input device 64. Input device 64 may include any one or more of a keyboard with buttons, touch-sensitive screen, microphone, handheld remote control, and other means for user input.

Input/output interface 66 comprises circuits and electronic components configured to send and receive data to/from supply air temperature sensor 16, feedback temperature sensor 17, supply air humidity sensor 18, feedback humidity sensor 19, and available cooling devices 14. Data communication may be achieved through electrical or optical cables. Data communication may be wireless, such as by using Wi-Fi technology. For example, controller 12 may be operatively coupled to any of sensors 16-19 and cooing devices 14 by a Wi-Fi network.

Figure 8:
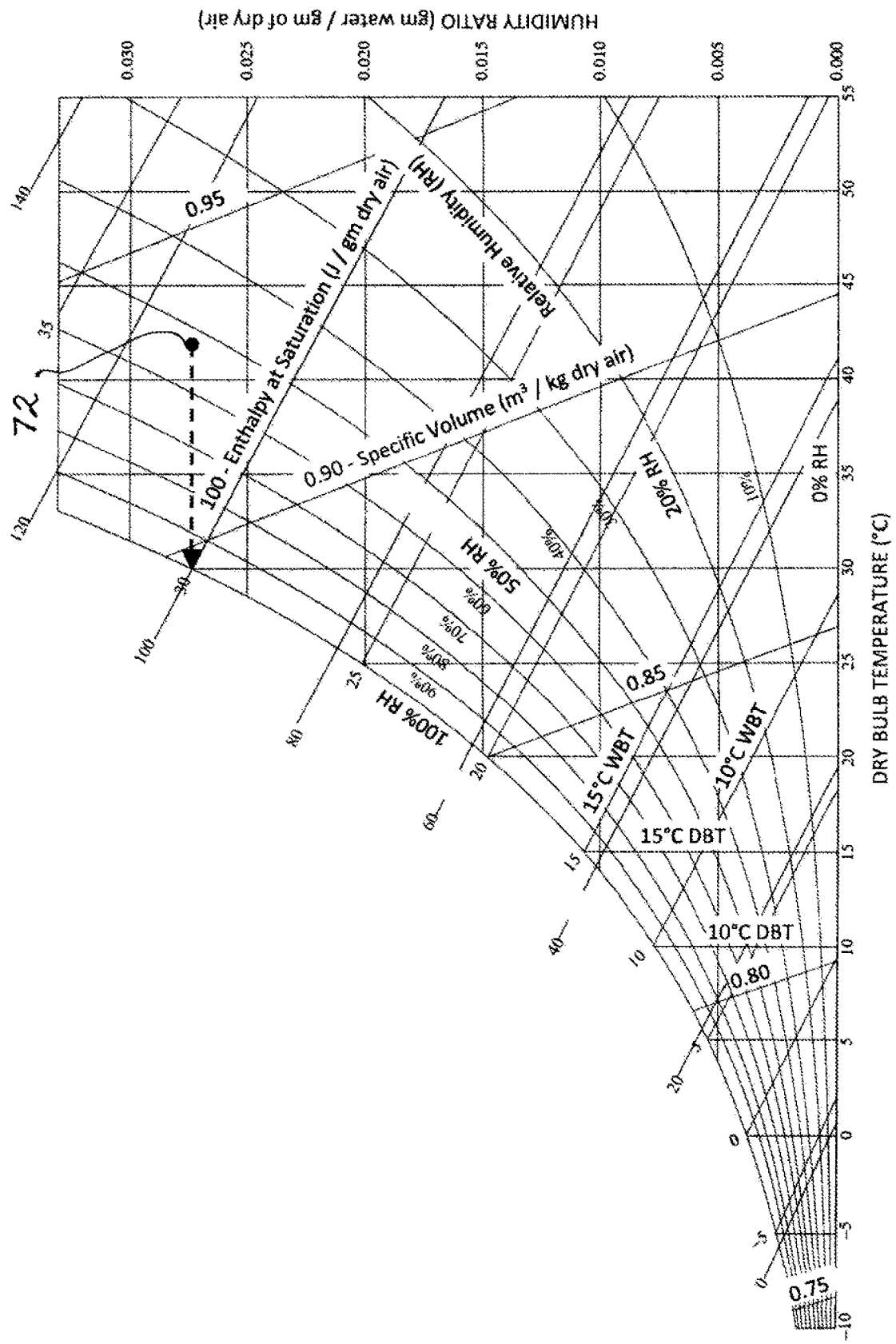
FIG. 8 is an example psychrometric chart.

Controller 12 uses a psychrometric chart to select one or more of concurrently available cooling devices 14 of different types. A psychrometric chart is graph of thermodynamic parameters of air at a particular pressure, which may corresponding to an elevation above sea level. FIG. 8 shows an example psychrometric chart for atmospheric pressure at sea level. The psychrometric chart may be flipped upside down (reflected) and rotated to obtain another version of the psychrometric chart, known as the Mollier diagram, which expresses the same relationships among thermodynamic parameters.

The psychrometric chart shows the relationship between independent thermodynamic parameters, namely dry bulb temperature (DBT) shown as vertical lines in FIG. 8, humidity ratio shown as horizontal lines, relative humidity (RH) shown as curved lines, wet bulb temperature (WBT) shown as diagonal lines that intersect DBT at 100% RH, specific enthalpy shown as diagonal lines, and specific volume shown as steeper diagonal lines. All parameters may be determined from two of the parameters and pressure. In addition, the dew point temperature may be obtained for a given position on the chart. In the example chart of FIG. 8, a dew point temperature of 30° C. is obtained by drawing a horizontal line (constant humidity ratio) from chart position 72 to the intercept of the 100% RH curve.

Air conditioning program 70 (FIG. 1) may include the psychrometric chart, either graphically or in the form of mathematical relationships between the thermodynamic parameters mentioned above. The mathematical relationships are well known and need not be described herein. To improve accuracy, controller 12 may also use atmospheric pressure since pressure is a factor in the relationships. Controller 12 may store an atmospheric pressure that controller 12 calculates from an elevation above sea level at which system 10 will operate. A user may enter the elevation into controller 12 via input device 64 (FIG. 1).

Figure 9:
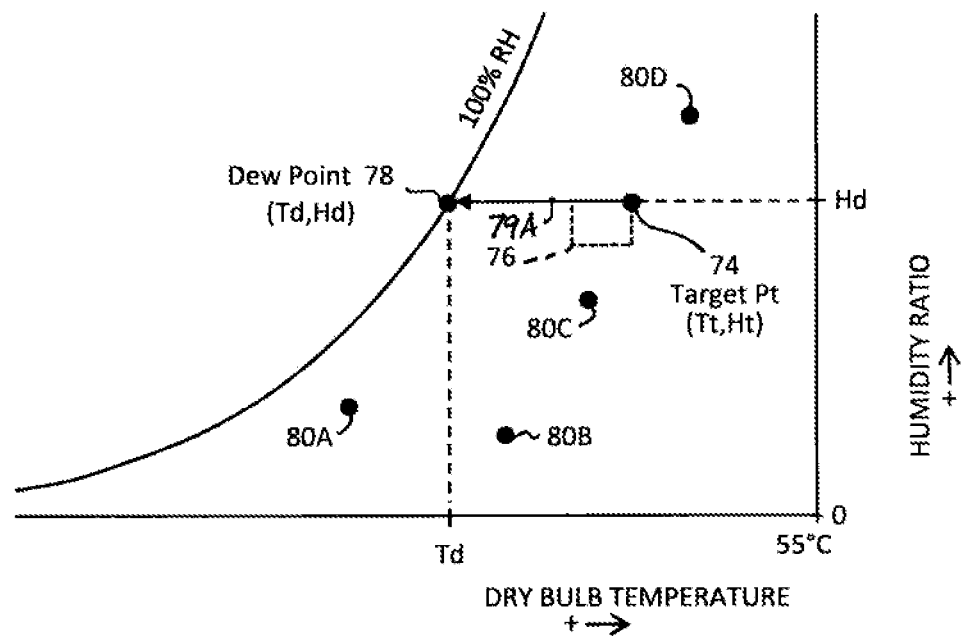
FIGS. 9 and 10 are psychrometric charts showing example dew points obtained from a target point.

FIG. 9 shows a psychrometric chart based on the atmospheric pressure at which system 10 is operating. Controller 12 is configured to store target point 74, which defines a target humidity ratio (Ht) and a target dry bulb temperature (Tt). Target point 74 may correspond to the temperature and humidity desired for the space to be cooled. Target point 74 may correspond to the chart position in comfort zone 76 with the greatest dry bulb temperature and humidity ratio. Target point 74 is the upper right corner of the rectangular comfort zone 76 in the examples of FIG. 9-14.

Controller 12 will control available devices 14 such that conditions in the space approach target point 74. Controller 12 will control available devices 14 such that air conditions are maintained within comfort zone 76. So that controller 12 may define target point 74, the user may enter any two of the independent thermodynamic parameters previously discussed. For example, the user may enter values for dry bulb temperature (e.g., 26° C.) and relative humidity (e.g., 58% RH). Alternatively, the user may enter values for dry bulb temperature and humidity ratio.

Controller 12 is configured to determine dew point 78 from target point 74. Dew point 78 defines a dew point humidity ratio (Hd) and a dew point temperature (Td) less than Tt.

In FIG. 9, dew point 78 is the intercept of the 100% RH curve and horizontal line 79A (constant humidity ratio) extending from target point 74. Dew point 78 is the point on the 100% RH curve having the same humidity ratio as target point 74. Thus, dew point humidity ratio (Hd) equals target humidity ratio (Ht) in this example.

Figure 10:
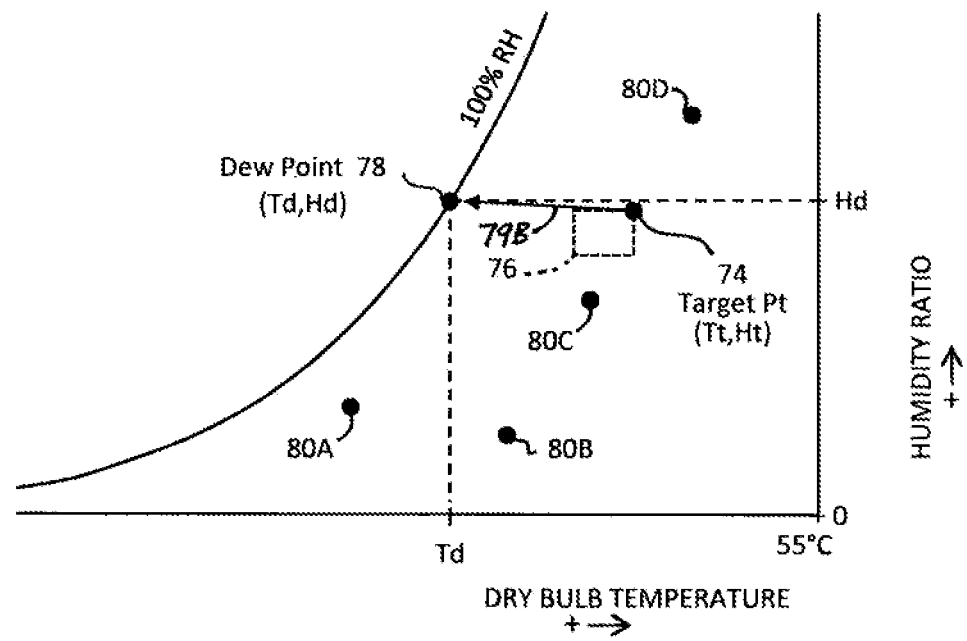

In FIG. 10, dew point 78 is the intercept of the 100% RH curve and oblique line 79B that extends from target point 74 with increasing humidity ratio. Dew point 78 is the point on the 100% RH curve having a humidity ratio that is greater than that of target point 74. The oblique line may be used to shift dew point 78 along the 100% RH curve in an effort to compensate for an inherent inefficiency for cooling the space. Dew point humidity ratio (Hd) is substantially equal to target humidity ratio (Ht). As used herein, "substantially equal" means "within 10% of" the referenced value. Thus, in FIG. 10, Hd is within plus and minus 10% of Ht. More narrowly, Hd is up to 10% greater than Ht. This may enable system 10 to maintain air in the space to be within comfort zone 76.

Controller 12 is configured to use output from supply air temperature sensor 16 and supply air humidity sensor 18 to determine a supply air position in a psychrometric chart. The supply air position defines a supply air dry bulb temperature (Ts) and a supply air humidity ratio (Hs). As previously discussed, any position in a psychrometric chart may be defined by any two independent thermodynamic parameters. Therefore, supply air humidity sensor 18 may provide a data signal to controller 12 that represents relative humidity instead of humidity ratio. Controller 12 uses this data together with data from supply air temperature sensor 16 to determine the supply air position.

In FIGS. 9 and 10, the supply air position can be any one of points 80A-80D as examples. In the morning, the supply air position may have a temperature and humidity corresponding point 80A. In the afternoon, the supply air position may have a temperature and humidity corresponding point 80B. During a warmer time of the year, the morning and afternoon may correspond to points 80C and 80D, respectively. Controller 12 alters the air conditioning process by selecting different types of cooling devices. Selection is performed according to the location of the supply air position in the psychrometric chart relative to dew point 78. The selected cooling device or devices is/are operated by controller 12 to cool the space. For example, if controller 12 selects fresh air cooling device 14A, controller 12 may turn on blower 20 of device 14A and turn off or reduce the activity of the blowers, pumps, compressors, etc. in any other available cooling device (e.g., any of 14B-14E) to conserve energy.

System 10 may comprise five different types of available cooling devices in the form of combination device 15 (FIG. 7A-17E). Controller 12 may set a combination of open and closed dampers 56 as in FIG. 7A to select fresh air cooling device 14A while excluding all other concurrently available cooling device types, namely devices 14B, 14C, 14D and 14E. Alternatively, controller 12 may set dampers 56 to select cooling device 14A while excluding fewer cooling device types. Alternatively, controller 12 may partially close dampers 56 to select device 14A while diminishing devices 14B, 14C, 14D, and/or 14E. As used herein for a cooling device, the terms "diminish" and "diminishing" refer to a reduction in the use of the cooling device to cool the space. Cooling devices 14B, 14C, 14D, and/or 14E are diminished by having a lesser amount of supply air pass through chambers 30 and 32 and a greater amount of supply air pass through chamber 52, which forms cooling device 14A.

The description above for selecting cooling device 14A, while excluding or diminishing other cooling devices, apply similarly to selection of cooling devices 14B, 14C, 14D, and 14E. For example, in selecting indirect/direct evaporative cooling device 14D, controller may set a combination of open and closed dampers 56 as in FIG. 7C that excludes all other concurrently available cooling device types, namely devices 14A, 14B, 14C, and 14E. Alternatively, controller 12 may set dampers 56 to select cooling device 14D while excluding fewer cooling device types. Alternatively, controller 12 may partially close dampers 56 to select device 14D while diminishing devices 14A, 14B, 14C, and/or 14E. Cooling devices 14A, 14B, 14C, and/or 14E are diminished, for example, by having a greater amount of supply air, but not all the supply air, pass through chambers 30 and 32, which form device 14D. For example, cooling device 14E may still be operating but with reduced compressor and fan activity.

As will be discussed below for FIGS. 11-14, controller 12 is configured to determine whether the supply air position is in a psychrometric chart region to determine which one or more of the different cooling device types should be selected to cool the space.

Figure 11:
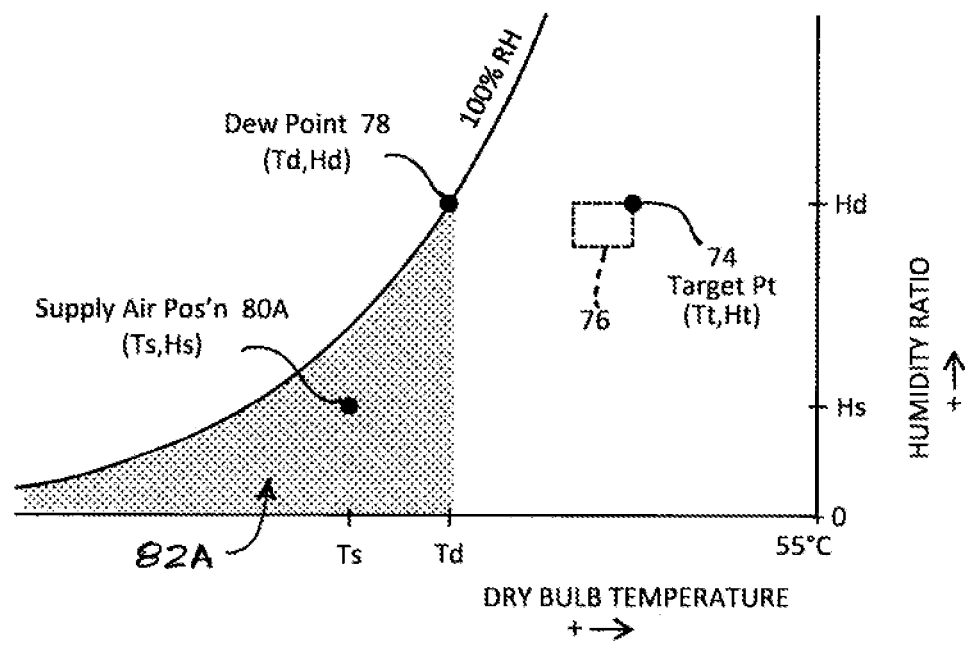
FIG. 11 is a psychrometric chart showing an example region to the left of and below a dew point.

In FIG. 11, supply air position 80A is located in psychrometric chart region 82A (the area indicated by a dot pattern) that is located to the left of and below dew point 78. Region 82A is the entire area at and below the 100% RH curve. For any supply air position in region 82A, the supply air dry bulb temperature (Ts) is less than or equal to dew point temperature (Td). Note that dry bulb temperature increases to the right, as indicated by the arrow and plus symbol at the bottom of FIG. 11. Controller 12 is configured to determine that Ts is less than or equal to Td, and then select fresh air cooling device 14A to cool the space on condition that Ts is less than or equal to Td. In addition to fresh air cooling device 14A, system 10 may additionally comprise any of evaporative cooling device 14B, indirect evaporative cooling device 14C, indirect/direct evaporative cooling device 14D, and direct expansion cooling device 14E. In which case, system 10 may select fresh air cooling device 14A, while excluding or diminishing any additional device (e.g., device 14B, 14C, 14D, and/or 14E) to cool the space.

Selecting fresh air cooling device 14A to the exclusion of or by diminishing other available devices may provide an efficiency advantage. When the supply air position is to the left of dew point 78, as in FIG. 11, the supply air dry bulb temperature (Ts) is significantly less than the target dry bulb temperature (Tt). Thus, it is possible to meter just the right amount of supply air into the space to be cooled to maintain conditions within comfort zone 76. Active cooling as performed by other cooling devices (e.g., 14B-14E) may not be required, or less may be required. However, if the supply air humidity ratio (Hs) is uncomfortably low, controller 12 may select fresh air cooling device 14A together with direct evaporative cooing device 14B. Direct evaporative cooing device 14B is not excluded since it humidifies the air In FIG. 12, supply air position 80B is located in psychrometric chart region 82B (the area indicated by a less dense dot pattern) that is to the right of dew point 78. The bottom of region 82B is the 0 humidity ratio line. The top of region 82B is bounded by boundary 84. Region 82B is the entire area at and below boundary 84. On boundary 84, the humidity ratio decreases as dry bulb temperature increases.

Boundary 84 may intersect dew point 78 and point 85. At point 85, humidity ratio is zero and dry bulb temperature is from 43° C. to 49° C. (110° F. to 120° F.). Boundary 84 comprises boundary first point 86 and boundary second point 88. Boundary first point 86 defines a boundary first point dry bulb temperature (T1) and a boundary first point humidity ratio (H1). Boundary second point 88 defines a boundary second point dry bulb temperature (T2) and a boundary second point humidity ratio (H2). Recall that dry bulb temperature increases to the right, as indicated by the arrow and plus symbol at the bottom of FIG. 12. These temperatures and humidity ratios satisfy:

Td<T1<T2, and

Hd>H1>H2.

In the illustrated example, the supply air humidity ratio (Hs) happens to be equal to H2. The supply air position (coordinates Ts, Hs) may be located elsewhere in psychrometric chart region 82B. For example, it is possible that:

Ts is equal to T1 or T2, or

Hs is equal to H1 or H2.

Each supply air position in region 82B at T1 has a humidity ratio that is less than or equal to H1. In addition, each position in region 82B at T2 has a humidity ratio that is less than or equal to H2. This can be seen graphically in the vertical lines for T1 and T2. Within region 82B, the humidity ratio is less than or equal to H1 for all points on the vertical line for T1, and is less than or equal to H2 for all points on the vertical line for T2.

Controller 12 is configured to determine that supply air position (e.g., 80B) is in psychrometric chart region 82B, and then select direct evaporative cooling device 14B to cool the space on condition that the supply air position is in region 82B. In selecting device 14B, controller 12 may exclude or diminish fresh air cooling device 14A. This is because the supply air dry bulb temperature will be either slightly lower or greater than target dry bulb temperature (Tt). If the supply air dry bulb temperature is slightly lower than Tt, then device 14A may not be able to handle the thermal load (e.g., heat generated by people, light fixtures, appliances, etc.) in the space to bring conditions to within comfort zone 76. On the other hand, direct evaporative cooling device 14B actively cools the supply air. Thus, it is likely that device 14B will be able to handle the thermal load.

In addition, most of the potential supply air positions in psychrometric chart region 82B have humidity ratios that are significantly lower than Ht. Thus, although device 14B adds humidity to the air due to direct contact with evaporating water, device 14B is unlikely to increase humidity outside of comfort zone 76. Controller 12 may select device 14B while excluding or diminishing another available device (e.g., 14D and/or 14E). Using outputs from feedback temperature sensor 17 and feedback humidity sensor 19, controller 12 may determine that device 14B alone is unable to maintain conditions within comfort zone 76, as may occur due to excessive thermal load from direct sunlight entering large windows. Upon such a determination, controller 12 may select device 14B together with device 14D and/or and 14E. Indirect/direct evaporative cooling device 14D comprises two evaporative cooling stages (chambers 30 and 32) and, thus, has a greater ability to cool supply air than device 14B. Direct expansion cooling device 14E uses compressed refrigerant, which can have a greater ability to cool supply air than devices that rely on evaporating water.

Figure 12:
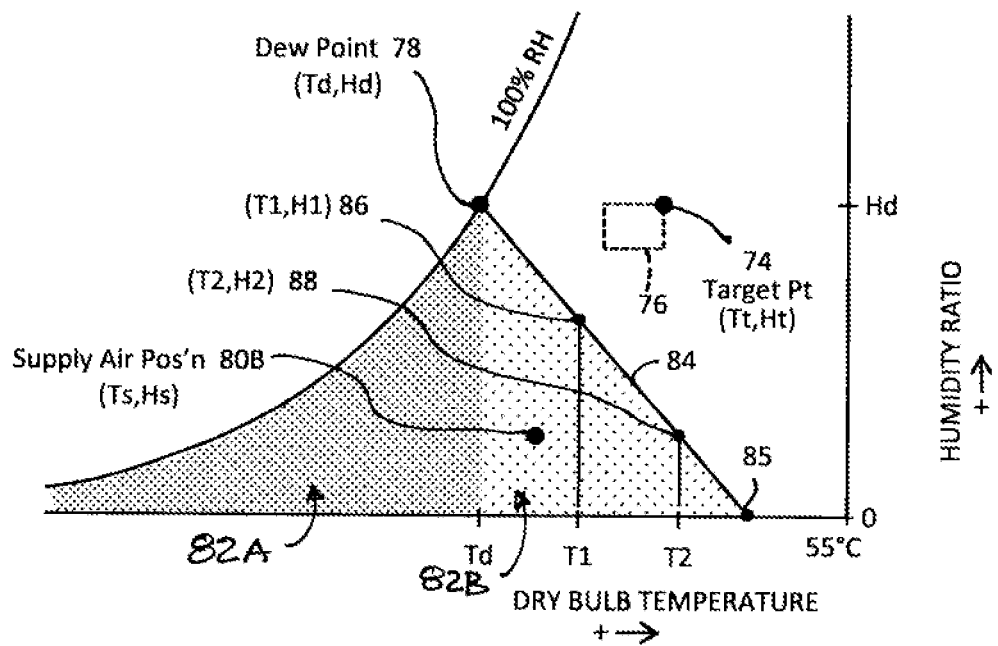
FIG. 12 is a psychrometric chart showing the region of FIG. 11 together with an example region to the right of the dew point.
Figure 13:
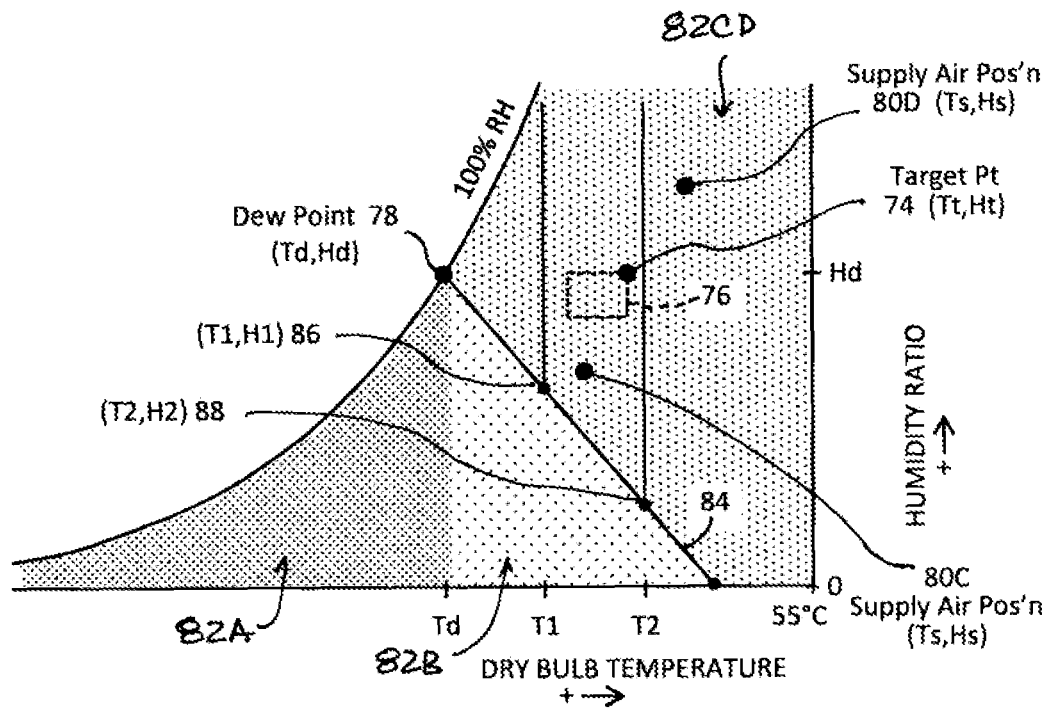
FIG. 13 is a psychrometric chart showing the regions of FIGS. 11 and 12 together with another example region to the right of the dew point.

In FIG. 13, the supply air position is at either point 80C or 80D. Supply air positions 80C and 80D are located in psychrometric chart region 82CD (indicated by a dot pattern) that is to the right of dew point 78. The top of region 82CD is bounded by the 100% RH curve. The bottom of region 82CD is bounded by boundary 84, which was described for FIG. 12. Each position in region 82CD at T1 has a humidity ratio that is greater than or equal to H1. In addition, each position in region 82CD at T2 has a humidity ratio that is greater than or equal to H2. This can be seen graphically in the vertical lines for T1 and T2. Within region 82CD, the humidity ratio is greater than or equal to H1 for all points on the vertical line for T1, and is greater than or equal to H2 for all points on the vertical line for T2.

Controller 12 is configured to determine that the supply air position (e.g., 80C or 80D) is in psychrometric chart region 82CD, and then select indirect/direct evaporative cooling device 14D or direct expansion cooling device 14E on condition that the supply air position is in region 82CD.

For supply air position 80C, the supply air dry bulb temperature (Ts) is less than the target dry bulb temperature (Tt). Thus, it is likely that indirect/direct evaporative cooling device 14D can handle the thermal load in the space to maintain conditions within comfort zone 76. Although device 14D adds humidity to the air due to direct contact with evaporating water, device 14D is unlikely to increase humidity to greater than comfort zone 76 since the supply air humidity ratio (Hs) is below the target humidity ratio (Ht). With supply air position 80C, controller 12 may select device 14D, while excluding or diminishing another available device (e.g., 14A, 14B, 14C, and/or 14E).

For supply air position 80D, the supply air dry bulb temperature and humidity ratio are significantly greater than the target dry bulb temperature (Tt) and target humidity ratio (Hs). As such, indirect/direct evaporative cooling device 14D may not be appropriate because of its limited ability to cool using evaporating water and because the evaporating water increases humidity. For similar reasons, direct evaporative cooling device 14B and indirect evaporative cooling device 14C may not be appropriate for supply air position 80D. Fresh air cooling device 14A is inappropriate since it does not actively cool the air. Thus, with supply air position 80D, controller 12 may select direct expansion cooling device 14E, while excluding or diminishing another available device (e.g., 14A, 14B, 14C, and/or 14D).

Figure 14:
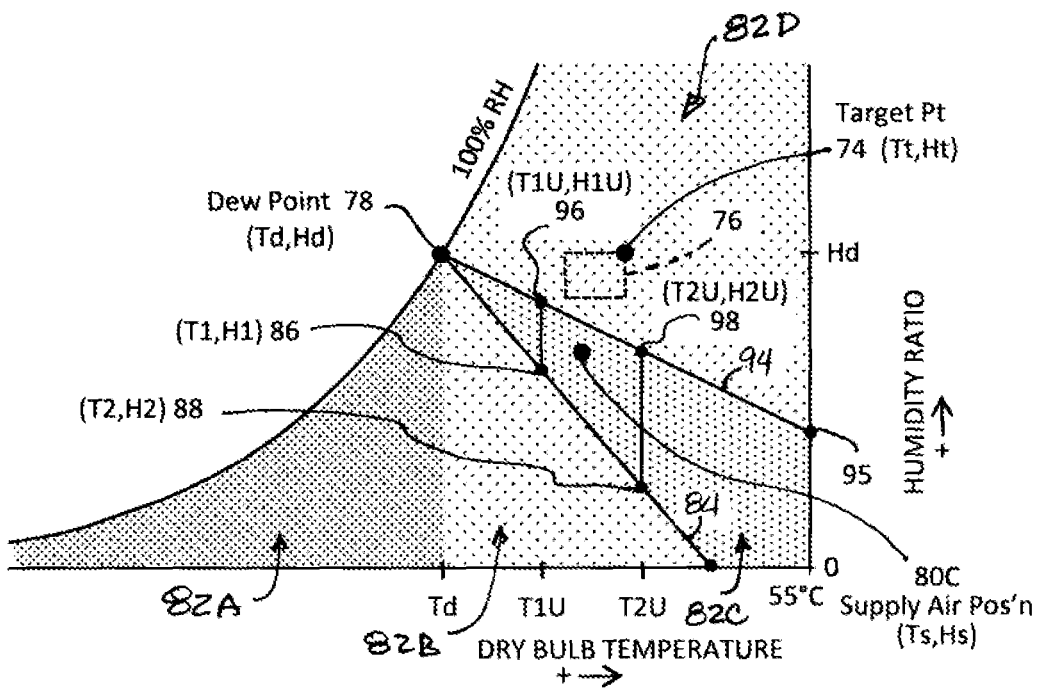
FIG. 14 is a psychrometric chart showing the regions of FIGS. 11 and 12 together with two more regions to the right of the dew point.

For the reasons discussed above, it would be advantageous to divide psychrometric chart region 82CD into regions 82C and 82D, as shown in FIG. 14. The top of region 82C is bounded by upper boundary 94, which is the lower boundary of region 82D. On boundary 94, the humidity ratio decreases as dry bulb temperature increases. Boundary 94 may intersect dew point 78 and point 95. At point 95, dry bulb temperature is 55° C. (131° F.) and humidity ratio is from 0.003 to 0.007 gm water/gm of dry air. Boundary 94 comprises upper boundary first point 96 and upper boundary second point 98. Upper boundary first point 96 defines an upper boundary first point dry bulb temperature (T1U) equal to T1 and an upper boundary first point humidity ratio (H1U) greater than H1. Upper boundary second point 98 defines an upper boundary second point dry bulb temperature (T2U) equal to T2 and an upper boundary second point humidity ratio (H2U) greater than H1. These temperatures and humidity ratios satisfy:

Td<T1U<T2U, and

Hd>H1U>H2U.

In the illustrated example, the supply air humidity ratio (Hs) for position 80C happens to be equal to H2U. The supply air position (coordinates Ts, Hs) may be located elsewhere in psychrometric chart region 82C. For example, it is possible that:

Ts is equal to T1U or T2U, or
Hs is equal to H1U or H2U.

Each position in region 82C at T1U has a humidity ratio from H1 to H1U. Each position region 82C at T2U has a humidity ratio from H2 to H2U. This can be seen graphically in the vertical lines for T1U and T2U. Within region 82C, the humidity ratio is from H1 to H1U for all points on the vertical line for T1U. The humidity ratio is from H2 to H2U for all points on the vertical line for T2U.

Controller 12 is configured to select indirect/direct evaporative cooling device 14D to cool the space on condition that the supply air position (e.g., 80C) is in psychrometric chart region 82C. In selecting device 14D, controller 12 may exclude or diminish fresh air cooling device 14A. This is because the supply air dry bulb temperature will be either slightly lower or greater than target dry bulb temperature (Tt). When the supply air dry bulb temperature is slightly lower than Tt, devices 14A, 14B, and 14C may not be able to handle the thermal load (e.g., heat generated by people, light fixtures, appliances, etc.) in the space to bring conditions to within comfort zone 76. On the other hand, indirect/direct evaporative cooling device 14D actively cools the supply air by using more than one evaporative cooling stage. Thus, it is likely that device 14D will be able to handle the thermal load better than devices 14A, 14B, and 14C.

As mentioned above, boundary 84 serves as the upper boundary of psychrometric chart region 82B, which is used to select direct evaporative cooling device 14B. Boundary 84 is sloped with decreasing humidity ratio while dry bulb temperature increases. Boundary 84, with this slope, may extend left to right from 20° C. (68° F.) to at least 45° C. (113° F.), or my extend left to right from the 100% RH curve to point 85 (FIG. 12). Boundary 84 is sloped since the evaporative cooling ability of device 14B depends on the humidity of the supply air. As the humidity of the supply air decreases, the evaporative cooling ability of device 14B increases. Thus, device 14B can be effective in cooling the space with supply air at high dry bulb temperature and low humidity. See, for example, point 85 on boundary 84 in FIG. 12. At point 85, the humidity ratio is zero and dry bulb temperature is from 43° C. to 49° C. (110° F. to 120° F.). Thus, if the supply air humidity ratio is zero, the supply air can have a dry bulb temperature of 40° C. (104° F.) and still be within region 82B. In which case, controller 12 may select direct evaporative cooling device 14B to cool the space toward target point 78. In FIGS. 11-14, target point 78 may correspond to Tt=26° C. and relative humidity of 58%, or Tt=26° C. and humidity ratio of 0.016 gm water/gm of dry air.

As mentioned above, boundary 94 serves as the upper boundary of psychrometric chart region 82C, which is used to select indirect/direct evaporative cooling device 14D. Boundary 94 is sloped with decreasing humidity ratio while dry bulb temperature increases. Boundary 94 with this slope may extend left to right from 20° C. (68° F.) to at least 55° C. (131° F.), or my extend left to right from the 100% RH curve to point 95 (FIG. 14). Boundary 94 is sloped since the evaporative cooling ability of device 14D depends on the humidity of the supply air for the reasons discussed above for device 14B in connection with boundary 84. The slope (the rate of decreasing humidity) of boundary 94 is less than that of boundary 84 since device 14D uses both direct and indirect evaporative cooling. With more than one evaporative cooling stage, device 14D has a greater ability to cool than device 14B. See, for example, point 95 on boundary 94 in FIG. 14. At point 95, dry bulb temperature is 55° C. (131° F.) and humidity ratio is from 0.003 to 0.007 gm water/gm of dry air. Thus, the supply air can have a dry bulb temperature as high as 55° C. with a humidity ratio of 0.003 and still be within region 82C. In which case, controller 12 may select indirect/direct evaporative cooling device 14D to cool the space toward target point 74.

Any of boundaries 84 and 94 may intersect dew point 78 as shown in FIGS. 12-14. In the illustrated examples, boundaries 84 and 94 are straight lines in which humidity ratio decreases as dry bulb temperature increases. Alternatively, boundaries 84 and 94 may be curved (not straight) lines in which humidity ratio decreases as dry bulb temperature increases.

Figure 15:
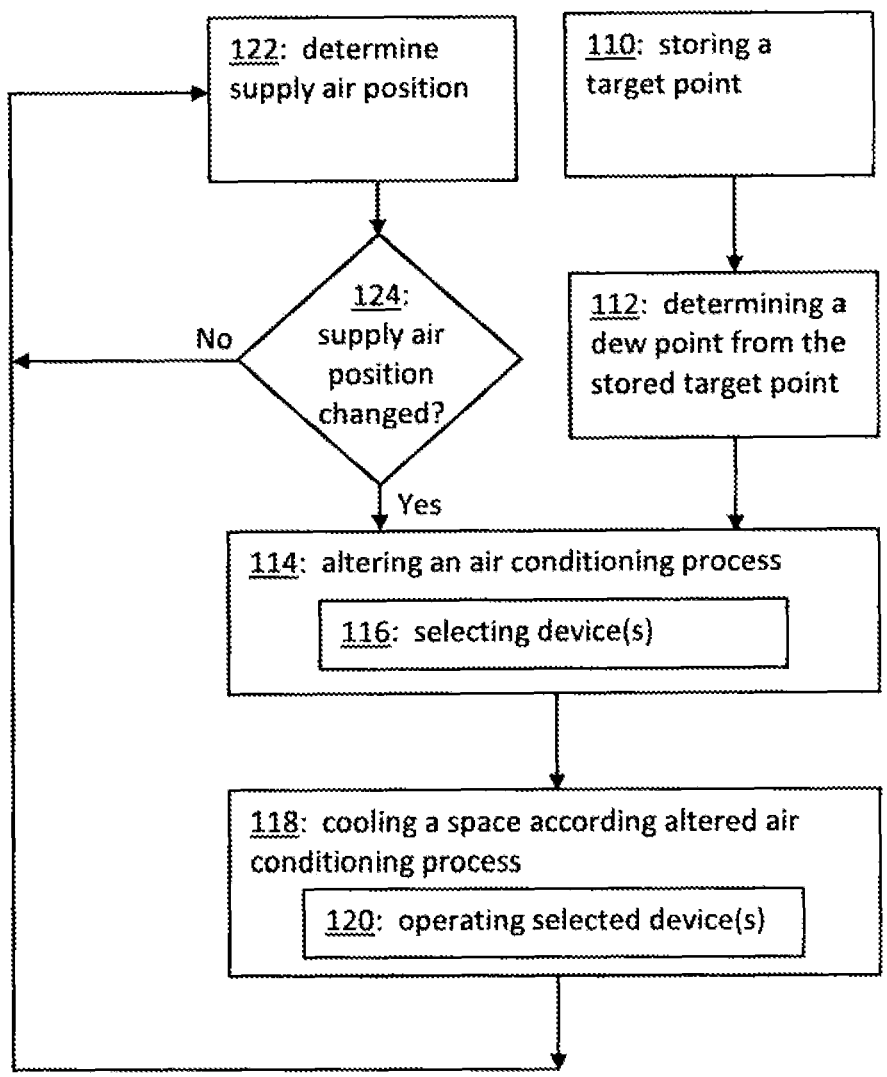
FIG. 15 is a flow diagram showing an example air conditioning method.

In FIG. 15, an example air conditioning method comprises storing a target point at block 110. The target point is stored by controller 12 in memory 62. The target point defines a target humidity ratio (Ht) and a target dry bulb temperature (Tt). At block 112, controller 12 determines a dew point from the stored target point. The dew point defines a dew point humidity ratio (Hd) and a dew point temperature (Td) less than Tt. For example, the dew point may be determined as described in connection with FIGS. 9 and 10.

At block 114, controller 12 alters an air conditioning process. Alteration involves selecting, at block 116, one or more of a plurality of available devices 14 of different types for use in the air conditioning process. The different types are concurrently available in system 10 and comprise at least two of a fresh air cooling device, a direct evaporative cooling device, an indirect evaporative cooling device, an indirect/direct evaporative cooling device, and a direct expansion cooling device. The selection is performed according to the location of a supply air position in a psychrometric chart relative to the dew point determined at block 112. The supply air position is derived by controller 12 from supply air sensors 16 and 18. The supply air position defines supply air dry bulb temperature (Ts) and a supply air humidity ratio (Hs).

Next, at block 118, the space is cooled according to the altered air conditioning process. Cooling of the space involves operating, at block 120, the selected device(s) 14. The process may proceed to block 122. Alternatively, block 122 may be performed before block 114 is performed for the first time.

At block 122, controller 12 determines the location of a supply air position in the psychrometric chart by using supply air temperature sensor 16 and supply air humidity sensor 18. At block 124, controller 12 determines whether the location has changed. For example, a change is registered (YES at block 124) if a change in temperature exceeds a temperature threshold (e.g., a percent change or a change in degrees) or if a change in humidity exceeds a humidity threshold (e.g., a percent change). If YES at block 124, the process proceeds to block 114 to alter the air conditioning process. If NO at block 124, the process proceeds returns to block 122, optionally after a delay time. The delay time may be at least 30 minutes, at least 1 hour, or at least 2 hours.

Figure 16:
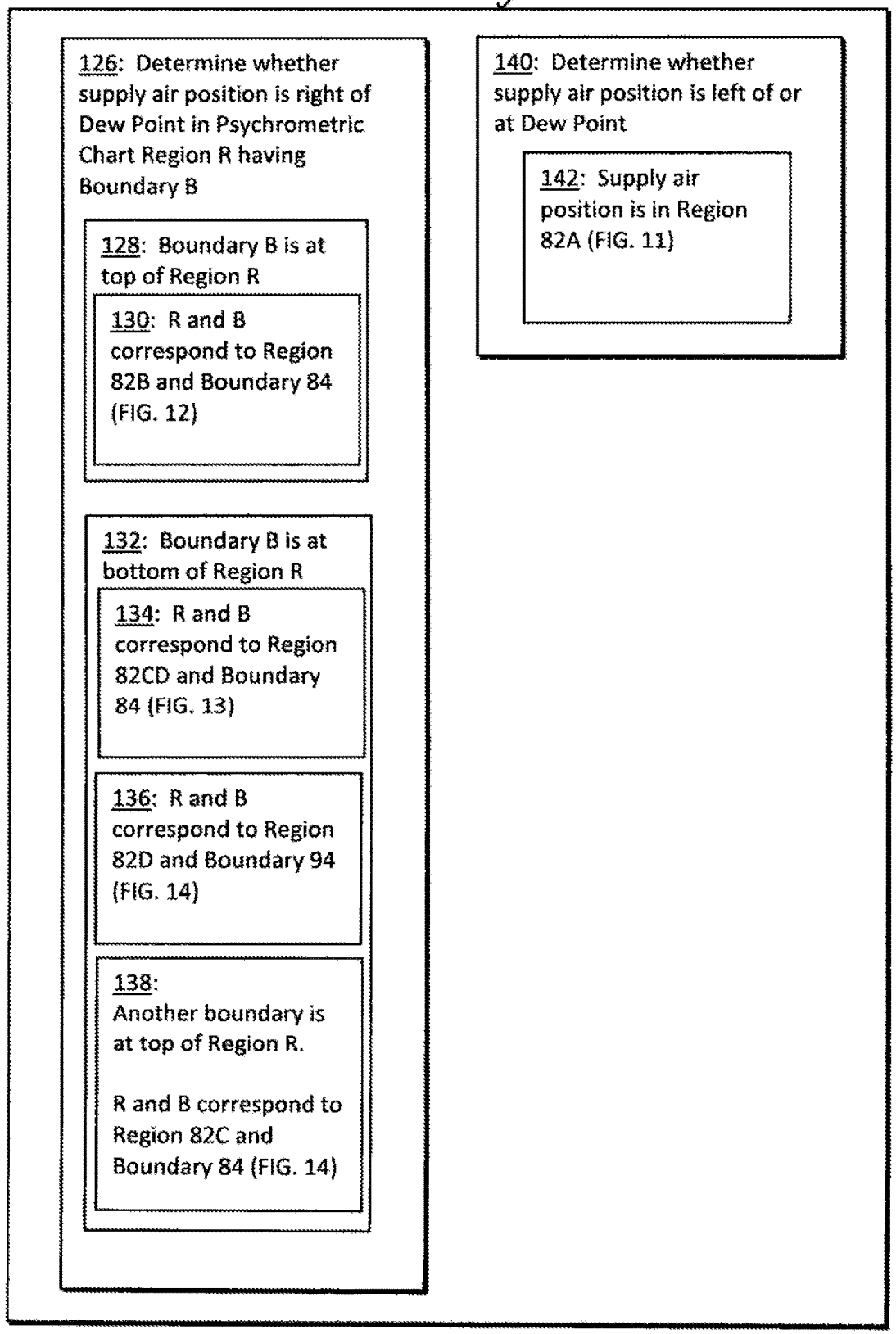
FIG. 16 is an organizational diagram showing example determinations for the location of a supply air position in a psychrometric chart.

FIG. 16 shows an organizational diagram for block 122 in determining the location of the supply air position. At block 126, controller 12 determines whether the supply air position is in a psychrometric chart region (R) to the right of the dew point. In region (R), supply air dry bulb temperature is greater than or equal to the dew point temperature (Td), and supply air humidity ratio is less than or equal to dew point humidity ration (Hd). Region (R) is bounded by a boundary (B) having a slope in which humidity ratio decreases while dry bulb temperature increases.

In block 128 of FIG. 16, boundary B is at the top of psychrometric chart region R. For example, as indicated in block 130, psychrometric chart region R may correspond to region 82B (FIG. 12) having boundary 84. Each position in region 82B at T1 has a humidity ratio that is less than or equal to H1, and each position in the region 82B at T2 has a humidity ratio that is less than or equal to H2. On condition that the supply air condition is in this psychrometric chart region, controller 12 selects (at block 116 in FIG. 15) direct evaporative cooling device 14B. Controller 12 may exclude or diminish any additional cooling device type (e.g., 14A, 14C, 14D and/or 14E).

In block 132 of FIG. 16, boundary B is at the bottom of psychrometric chart region R. For example, as indicated in block 134, psychrometric chart region R may correspond to region 82CD (FIG. 13) having boundary 84. Each position in region 82CD at T1 has a humidity ratio that is greater than or equal to H1, and each position in the region 82CD at T2 has a humidity ratio that is greater than or equal to H2. On condition that the supply air condition is in this psychrometric chart region, controller 12 selects (at block 116 in FIG. 15) indirect/direct evaporative cooling device 14D or direct expansion cooling device 14E. Controller 12 may exclude or diminish any additional cooling device type (e.g., 14A, 14B, and/or 14C).

Alternatively, as indicated in block 136, psychrometric chart region R may correspond to region 82D (FIG. 14) with boundary 94 at the bottom of region 82D. On condition that the supply air condition is in this psychrometric chart region, controller 12 selects (at block 116 in FIG. 15) direct expansion cooling device 14E. Since temperature and humidity are relatively high in this psychrometric chart region, it is unlikely that evaporative and fresh air cooling processes will be sufficient. Controller 12 may exclude or diminish any additional cooling device type (e.g., 14A, 14B, 14C, and/or 14D).

Alternatively, as indicated in block 138, psychrometric chart region R may have boundary B at the bottom and an upper boundary at the top. For example, psychrometric chart region R may correspond to region 82C (FIG. 14) with boundary 84 and upper boundary 94. Each position in region 82C at T1U has a humidity ratio from H1 to H1U, and each position in region 82C at T2U has a humidity ratio from H2 to H2U. On condition that the supply air condition is in this psychrometric chart region, controller 12 selects (at block 116 in FIG. 15) indirect/direct evaporative cooling device 14D. Controller 12 may exclude or diminish any additional cooling device type (e.g., 14A, 14B, 14C, and/or 14E).

In block 140 of FIG. 16, controller 12 determines whether the supply air position is to the left of or at the dew point. That is, controller 12 determines whether the supply air dry bulb temperature (Ts) is less than or equal to the dew point temperature (Td). For example, as indicated in block 144, the supply air position (Ts, Hs) may be located in psychrometric chart region 82A (FIG. 11). On condition that Ts is less than or equal to Td, controller 12 selects (at block 116 in FIG. 15) fresh air cooling device 14A. Since temperature and humidity are relatively low in this psychrometric chart region, it is unlikely that evaporative and expansion cooling processes will be needed. Controller 12 may exclude or diminish any additional cooling device type (14B, 14C, 14D, and/or 14E).

As described above, the air conditioning system and method herein allows for effective cooling of a space by altering the cooling process in terms of the types of cooling devices used. Whenever possible (as determined by the supply air position in the psychrometric chart), controller 12 selects an economical combination of device types (e.g., fresh air cooling device 14A and/or direct evaporative cooling device 14B) while excluding or diminishing device types (e.g., indirect/direct evaporative cooling device 14D and/or direct expansion cooling device 14E) that usually consume greater amounts of energy. After the cooling device type(s) are selected, controller 12 may make adjustments by increasing or decreasing the amount of cooled air provided by the selected cooling device type(s). The adjustments are based on signals from feedback temperature sensor 17 and feedback humidity sensor 19, which are located in the space being cooled. Controller 12 periodically alters the air conditioning process by selecting other device types based on current supply air conditions, which may change throughout the course of the day.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in order to form varying modes of the invention. Accordingly, it is not intended that the invention be limited, except as by the appended claims.

What is claimed is:

1. An air conditioning system comprising:
   a supply air temperature sensor;
   a supply air humidity sensor;
   a plurality of available devices of different types comprising at least two of a fresh air cooling device, a direct evaporative cooling device, an indirect evaporative cooling device, an indirect/direct evaporative cooling device, and a direct expansion cooling device; and
   a controller configured to
      store a target point defining a target humidity ratio (Ht) and a target dry bulb temperature (Tt),
      determine a dew point from the stored target point, the dew point defining a dew point humidity ratio (Hd) and a dew point temperature (Td) less than Tt,
      use output from the supply air temperature sensor and the supply air humidity sensor to determine a supply air position in a psychrometric chart, the supply air position defining a supply air dry bulb temperature (Ts) and a supply air humidity ratio (Hs) of supply air for the available devices,
      alter an air conditioning process by selecting one or more of the available devices to cool a space, the selecting performed according to location of the supply air position in the psychrometric chart relative to the dew point, and
      operate the one or more selected available devices to cool the space according to the altered air conditioning process.

2. The system of claim 1, wherein Hd is substantially equal to Ht.

3. The system of claim 1, further comprising:
   wherein the controller is configured to determine whether the supply air position is in a psychrometric chart region to determine which one or more of the available devices should be selected to cool the space,
   wherein the psychrometric chart region is bounded by a boundary that comprises a boundary first point and a boundary second point, the boundary first point defines a boundary first point dry bulb temperature (T1) and a boundary first point humidity ratio (H1), the boundary second point defines a boundary second point dry bulb temperature (T2) and a boundary second point humidity ratio (H2), T1 and T2 satisfy Td<T1<T2, and H1 and H2 satisfy Hd>H1>H2.

4. The system of claim 3, wherein Ts is equal to T1 or T2, or wherein Hs is equal to H1 or H2.

5. The system of claim 3, wherein each position in the psychrometric chart region at T1 has a humidity ratio that is less than or equal to H1, each position in the psychrometric chart region at T2 has a humidity ratio that is less than or equal to H2, and the controller is configured to determine that the supply air position is in the psychrometric chart region, and select the direct evaporative cooling device to cool the space on condition that the supply air position is in the psychrometric chart region.

6. The system of claim 3, wherein each position in the psychrometric chart region at T1 has a humidity ratio that is greater than or equal to H1, each position in the psychrometric chart region at T2 has a humidity ratio that is greater than or equal to H2, and the controller is configured to determine that the supply air position is in the psychrometric chart region, and select the indirect/direct evaporative cooling device or the direct expansion cooling device to cool the space on condition that the supply air position is in the psychrometric chart region.

7. The system of claim 6, wherein:

the available devices comprise the direct expansion cooling device and an additional available device, the additional available device is any of the fresh air cooling device, the direct evaporative cooling device, the indirect evaporative cooling device, and the indirect/direct evaporative cooling device, and the controller is configured to determine that the supply air position is in the psychrometric chart region, and select the direct expansion cooling device, while excluding or diminishing the additional available device, to cool the space on condition that the supply air position is in the psychrometric chart region.

8. The system of claim 6, wherein:

the psychrometric chart region is bounded by an upper boundary that comprises an upper boundary first point and an upper boundary second point, the upper boundary first point defines an upper boundary first point dry bulb temperature (T1U) equal to T1 and an upper boundary first point humidity ratio (H1U) greater than H1, the upper boundary second point defines an upper boundary second point dry bulb temperature (T2U) equal to T2 and an upper boundary second point humidity ratio (H2U) greater than H1, T1U and T2U satisfy Td<T1U<T2U, H1U and H2U satisfy Hd>H1U>H2U, each position in the psychrometric chart region at T1U has a humidity ratio from H1 to H1U, each position in the psychrometric chart region at T2U has a humidity ratio from H2 to H2U, and the controller is configured to select the indirect/direct evaporative cooling device to cool the space on condition that the supply air position is in the psychrometric chart region.

9. The system of claim 8, wherein Ts is equal to T1U or T2U, or wherein Hs is equal to H1U or H2U.

10. The system of claim 1, wherein the available devices comprise the fresh air cooling device and an additional available device, the additional cooling device is any of the direct evaporative cooling device, the indirect evaporative cooling device, the indirect/direct evaporative cooling device, and the direct expansion cooling device, and the controller is configured to determine that Ts is less than or equal to Td, and select the fresh air cooling device, while excluding or diminishing the additional available device, to cool the space on condition that Ts is less than or equal to Td.

11. An air conditioning method comprising:

storing a target point defining a target humidity ratio (Ht) and a target dry bulb temperature (Tt);

determining a dew point from the stored target point, the dew point defining a dew point humidity ratio (Hd) and a dew point temperature (Td) less than Tt;

altering an air conditioning process for cooling a space, comprising selecting one or more of a plurality of available devices of different types for use in the air conditioning process, the different types being concurrently available in an air conditioning system and comprising at least two of a fresh air cooling device, a direct evaporative cooling device, an indirect evaporative cooling device, an indirect/direct evaporative cooling device, and a direct expansion cooling device, the selecting performed according to location of a supply air position in a psychrometric chart relative to the dew point, the supply air position defining a supply air dry bulb temperature (Ts) and a supply air humidity ratio (Hs) of supply air for the available devices; and cooling the space according to the altered air conditioning process, by operating the one or more selected available devices.

12. The method of claim 11, wherein Hd is substantially equal to Ht.

13. The method of claim 11, further comprising:

determining whether the supply air position is in a psychrometric chart region to determine which one or more of the different types of devices should be selected for use in the air conditioning process, wherein the psychrometric chart region is bounded by a boundary that comprises a boundary first point and a boundary second point, the boundary first point defines a boundary first point dry bulb temperature (T1) and a boundary first point humidity ratio (H1), the boundary second point defines a boundary second point dry bulb temperature (T2) and a boundary second point humidity ratio (H2), T1 and T2 satisfy Td<T1<T2, and H1 and H2 satisfy Hd>H1>H2.

14. The method of claim 13, wherein Ts is equal to T1 or T2, or wherein Hs is equal to H1 or H2.

15. The method of claim 13, wherein each position in the psychrometric chart region at T1 has a humidity ratio that is less than or equal to H1, each position in the psychrometric chart region at T2 has a humidity ratio that is less than or equal to H2, the method comprises determining that the supply air position is in the psychrometric chart region, and the selecting of one or more different types of devices in the air conditioning system comprises selecting the direct evaporative cooling device for use in the air conditioning process, the direct evaporative cooling device selected on condition that the supply air position is in the psychrometric chart region.

16. The method of claim 13, wherein
each position in the psychrometric chart region at T1 has a humidity ratio that is greater than or equal to H1,
each position in the psychrometric chart region at T2 has a humidity ratio that is greater than or equal to H2,
the method further comprises determining that the supply air position is in the psychrometric chart region, and
the selecting of one or more different types of devices in the air conditioning system comprises selecting the indirect/direct evaporative cooling device or the direct expansion cooling device for use in the air conditioning process, the indirect/direct evaporative cooling device or the direct expansion cooling device selected on condition that the supply air position is in the psychrometric chart region.

17. The method of claim 16, wherein:
the different types of devices in the air conditioning system comprise the direct expansion cooling device and an additional available device,
the additional available device is any of the fresh air cooling device, the direct evaporative cooling device, the indirect evaporative cooling device, and the indirect/direct evaporative cooling device,
the method comprises determining that the supply air position is in the psychrometric chart region, and
the selecting of one or more different types of devices in the air conditioning system comprises selecting the direct expansion cooling device for use in the air conditioning process, wherein the direct expansion cooling device is selected on condition that the supply air position is in the psychrometric chart region, and the additional available device is excluded from or diminished in the air conditioning process.

18. The method of claim 16, wherein:
the psychrometric chart region is bounded by an upper boundary that comprises an upper boundary first point and an upper boundary second point,
the upper boundary first point defines an upper boundary first point dry bulb temperature (T1U) equal to T1 and an upper boundary first point humidity ratio (H1U) greater than H1,
the upper boundary second point defines an upper boundary second point dry bulb temperature (T2U) equal to T2 and an upper boundary second point humidity ratio (H2U) greater than H1,
T1U and T2U satisfy Td<T1U<T2U,
H1U and H2U satisfy Hd>H1U>H2U,
each position in the psychrometric chart region at T1U has a humidity ratio from H1 to H1U,
each position in the psychrometric chart region at T2U has a humidity ratio from H2 to H2U, and
the selecting of one or more different types of devices in the air conditioning system comprises selecting the indirect/direct evaporative cooling device for use in the air conditioning process, the indirect/direct evaporative cooling device selected on condition that the supply air position is in the psychrometric chart region.

19. The method of claim 18, wherein Ts is equal to T1U or T2U, or wherein Hs is equal to H1U or H2U.

20. The method of claim 11, wherein
the different types of devices in the air conditioning system comprise the fresh air cooling device and an additional available device,
the additional cooling device is any of the direct evaporative cooling device, the indirect evaporative cooling device, the indirect/direct evaporative cooling device, and the direct expansion cooling device,
the method further comprises determining that Ts is less than or equal to Td, and
the selecting of one or more different types of devices in the air conditioning system comprises selecting the fresh air cooling device for use in the air conditioning process, wherein the fresh air cooling device is selected on condition that Ts is less than or equal to Td, and the additional available device is excluded from or diminished in the air conditioning process.

* * * * *

UNITED STATES PATENT AND TRADEMARK OFFICE
CERTIFICATE OF CORRECTION

PATENT NO.        : 11,002,455 B2
APPLICATION NO.   : 16/190629
DATED             : May 11, 2021
INVENTOR(S)       : Mohamed Farouk Salem et al.

Page 1 of 1

It is certified that error appears in the above-identified patent and that said Letters Patent is hereby corrected as shown below:

On the Title Page

Left column, item (73):
Please change the Assignee from "Air2O Inc." to --Innovative Climatic Technologies Corporation--

Signed and Sealed this
Nineteenth Day of December, 2023

Katherine Kelly Vidal
*Director of the United States Patent and Trademark Office*